NON-TRANS PERIOD

TRANS PERIOD

DISPLAY RESULT

INVENTOR
ALAN F. HAUGHT
RUSSELL G. MEYERAND, JR.
BY *Melvin Pearson Williams*
ATTORNEY

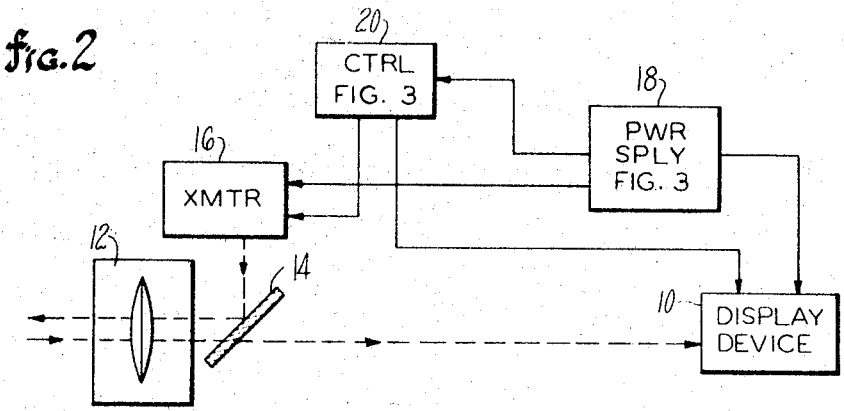
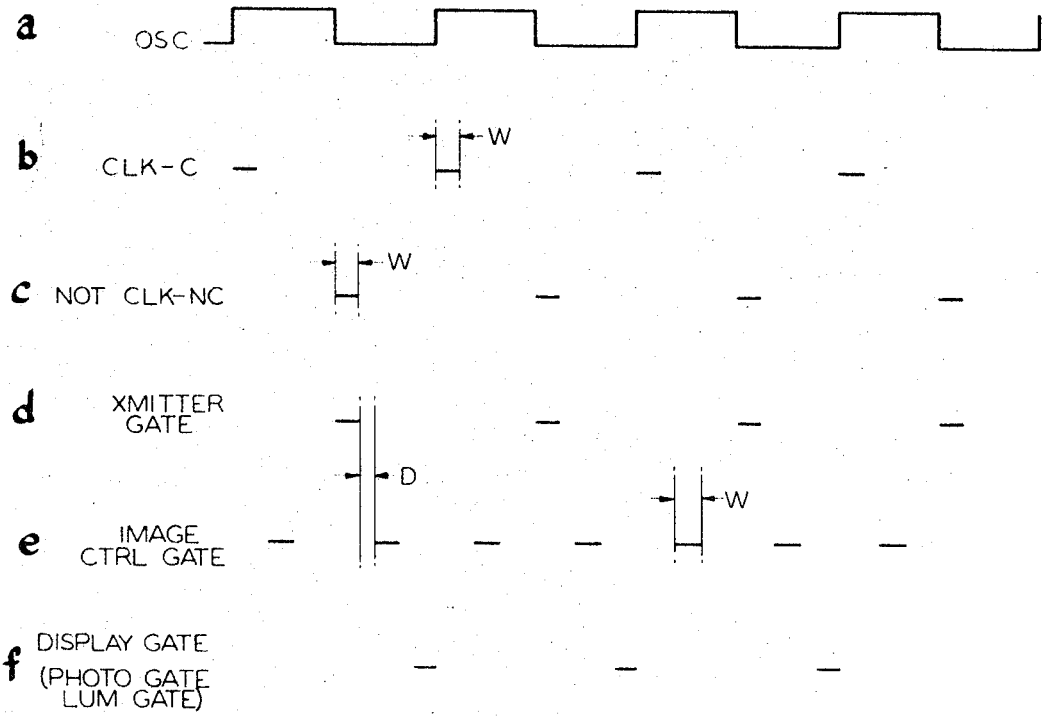

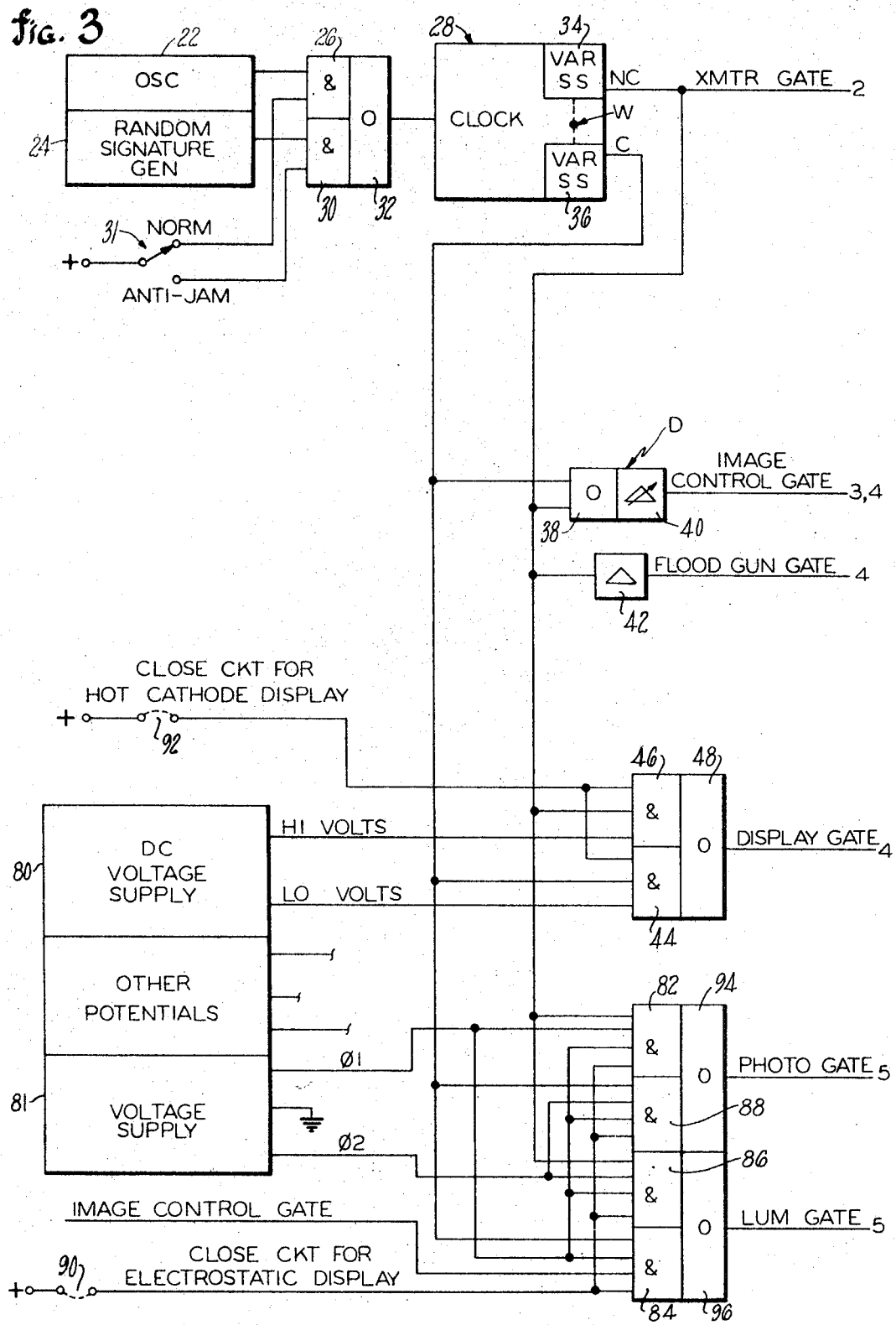

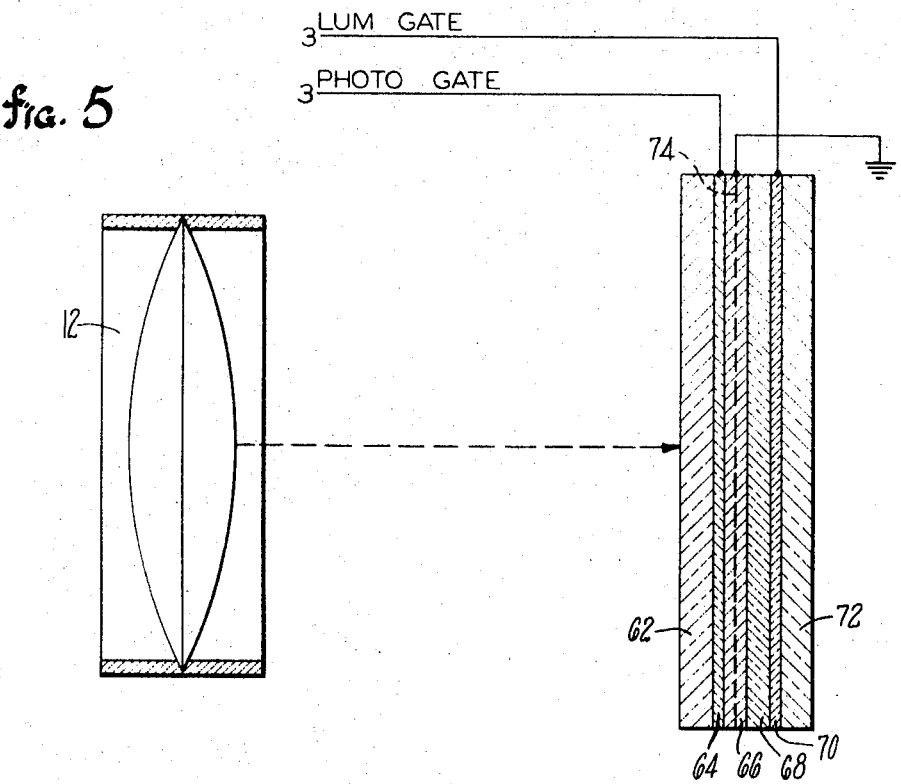
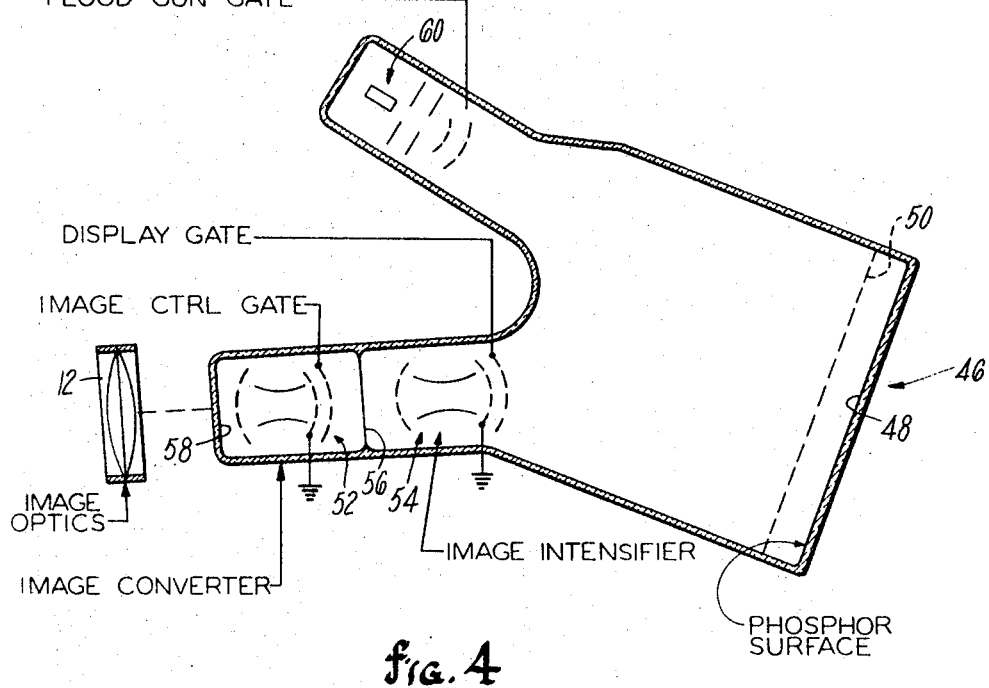

United States Patent Office 3,463,588
Patented Aug. 26, 1969

3,463,588
RADAR SYSTEM
Russell G. Meyerand, Jr., and Alan F. Haught, Glastonbury, Conn., assignors to United Aircraft Corporation, East Hartford, Conn., a corporation of Delaware
Filed Dec. 30, 1966, Ser. No. 606,274
Int. Cl. G01c 3/08
U.S. Cl. 356—5
5 Claims

ABSTRACT OF THE DISCLOSURE

Positive images resulting from backscattering of transmitted energy and ambient energy are interleaved with negative images resulting only from ambient energy so as to cancel ambient images from the display of an optical radar, in response to interleaved alternative controlling signals. Range and band of range control are provided by controlling the timing relationships of the controlling signals.

---

This invention relates to radar systems and more particularly to simplified radar systems having improved response characteristics.

In radar systems known to the prior art, the information displayed on an image producing surface, such as the screen of a cathode ray tube, is developed as the summation of a sequence of individual responses to energy transmissions which are oriented in a sequence of different directions so as to scan the area to be searched or viewed by the radar. Although the energy transmitted for the purpose of detecting targets is theoretically collimated to a conceptual line and directed toward a conceptual point, the energy transmitted is in fact dispersed over a finite cross-sectional area, transversely of the transmission, and therefore covers a finite area in the region of the target. For this reason, resolution of target configuration information is limited to the finite width of the beam of transmitted energy, as well as by the parameters of the receiving and display equipment utilized to present the information derived therefrom. Thus, when a target is detected, detailed examination of the configuration of the target is not possible with radar systems known to the prior art since the resolution of the finite cross-sectional area of the energy is larger than the individual portions of targets which are to be examined in greater detail.

In order to improve somewhat upon this characteristic of radar systems, certain prior art devices have resorted to energy sources operating at frequencies in the near-visual spectrum so as to permit utilizing physical optics for improving the spot definition of the beam and of the backscattered energy received from the target. As used herein, "optical" means having to do with physical optics, rather than visual "optical" energy and includes visible light and energy of other wavelengths capable of being handled according to the techniques of physical optics. Because of the very short wavelength of energy transmitted in the near-visual spectrum, good control over the energy transmitted and received is provided with components of relatively small size, and further, the advantages of physical optics are obtained. Such devices are commonly referred to as optical radar systems. However, due to dispersion characteristics of the atmosphere, and to other limitations in the systems, the shortcomings described hereinbefore are not fully overcome with previous optical radar systems. In such systems, although a great degree of collimation of the transmitted beam is achieved, the degree of resolution of displayed target images is still likely to exceed the size of targets, so that such systems have been unsuccessful in providing images which permit close examination and identification of the physical characteristics of targets, but are rather limited to detecting merely the presence of targets and in some cases distinguishing between a plurality of targets. In some instances, there may be a plurality of targets, and the targets may be moving relative to one another on the image formed by the radar; in such cases, it is possible for the identification of targets to become interchanged, whereby a radar tracking device or a radar operator may inadvertently switch from one target to another.

It is therefore an object of the present invention to provide a radar system having a very high degree of resolution.

Another object is to provide a radar system having control of resolution of target definition which is unlimited by the degree of collimation of the transmitted target-detecting energy.

In addition, since the energy transmitted covers a small finite cross-sectional area, the direction of radiation of the primary energy source must be centrally oriented directly at some portion of a target in order for that target to be picked up by the system. Therefore, scanning equipment used to be used for initial detection or search purposes must be capable of directing the primary energy to all of the points of a theoretical matrix of resolution which lie within the area which is to be searched by the radar.

Another object of the present invention is the elimination of scanning in radar systems. A related object is the provision of a direct field image producing radar system.

Conventional radar systems are subject to jamming since they are responsive merely to the presence or absence of received energy. This is a characteristic which results from utilization of spot-scanning techniques. A steady-state jamming signal emanating from any source within the directional pattern of reception will necessarily introduce energy into the system. Heretofore, the effects of jamming have been reduced by filtering out energy received by the radar which has a repetition rate, or other parameter different from that of the energy transmitted by the radar. The best anti-jamming techniques known in the prior art are therefore marginal and require highly complex techniques.

A further object of the present invention is provision of a radar system which is inherently virtually insensitive to jamming.

For fire control purposes, short range radar devices utilizing energy in the visual and near-visual spectrums have been developed for the provision of relatively highly resolved images of targets (compared with long range search radars). A typical example is a gun sight radar for use on military aircraft. In such devices, sequential single-spot scanning is used in the manner described hereinbefore. Whenever a target is located, the field of scan may be reduced so as to provide a greater rate of scanning over a lesser area, the area including the located target. Devices of this type used heretofore have been subject to certain limitations in the quality of the produced image due to the poor ratio of reflective energy to background energy which is received at the device. Since single spot scanning is utilized, for each position of the scan there is received energy which has been transmitted and reflected from an object, but also background energy which emanates from other sources. During daylight hours, there is a considerable amount of energy in the visual, subvisual and ultravisual spectrums. Therefore, it has heretofore been difficult to establish target images which distinguish clearly from random background energy or noise. Regardless of the number of times that the target may be scanned, the ratio is the same, and no improvement in target clarity on the display device is obtained.

Still another object of the present invention is to provide a radar system with an inherently-improved signal to noise characteristic. A related object is to provide a radar system which eliminates background images and noise from the target image display.

More specific objects of the invention include:

Provision of a radar system in accordance with any of the foregoing objects which maintains a direct range determining capability;

Provision of a radar system in accordance with any of the foregoing objects which provides a direct velocity-determining capability;

Provision of improved target-image radar systems;

Provision of improved short range fire control radar systems;

Provision of improved radar systems suitable for use in military aircraft gun sight applications;

Provision of improved fire control radar having good field-adjustment and target resolution characteristics;

Provision of a radar system operating in the near-visual frequency range having an inherently high signal to noise ratio;

Provision of an image producing radar system having a substantially infinite control over size of field searched;

Provision of a short range radar having a very high degree of control over useful resolution for use, for instance, in target identification;

Provision of a radar system capable of an adjustable range of field;

Provision of a radar system having an inherently high rate of image reproduction;

Provision of a radar system having an image to background noise ratio which is independent of the frequency and repetition rate of the transmitted energy and which is very nearly independent of spurious noise and background energies emanating from sources within the area of operation of the radar system.

In accordance with the present invention, an image forming receiving system includes phase sensitive detection to discriminate between backscattering targets and the noise of natural or other sources. The target or field of view to be investigated with the optical imaging radar is periodically subjected to the radiation of a high energy source. An optical system is used to form an image of the field of view in a phase sensitive image detection receiver. The optical system may be variable between wide angles for searching and tracking, and magnified narrow angles for examination and identification. The receiver and the transmitter are maintained in known phase relationship, the image received being recorded positively during periods in which the energy is transmitted and the image received during periods in which there is no transmission of energy being recorded negatively (or erased). By this means, nonsynchronized image forming signals resulting from external energy sources (those which are not the result of backscattering from the transmitted energy) are averaged to zero. The pulsed energy reflected from the target or field of view is, however, in phase with the receiver gating and is not cancelled. The result is an image of the field of view as reflected from the transmitted pulse of energy with the interference of background irradiation or jamming sources eliminated.

More specifically, one embodiment of the invention utilizes alternate image-generating periods in combination with a high-energy source of transmitted light, such as the modulated output of a laser, which is operated in phase with one of the alternative periods so as to provide periods including the illumination of the target by a bright light interleaved with periods in which the target is not illuminated by the system. The receiver and display system is responsive to light images received from the general direction of the target or field of search in both the illuminated and unilluminated periods. During the unilluminated periods, the light image received is used to proivde an image manifestation of a first phase or polarity (i.e., a negative charging of a display tube grid) and during the illuminated periods the energy is used to provide an image manifestation of a phase or polarity which is opposite to that provided during the unilluminated period (i.e., a positive charging of the same grid). Any component of the image manifestation generated during both periods will be the result of background, noise, or other external sources, and since these are of opposite or complementary phases, the two manifestations will cancel each other. The component of image manifestation from light generated by the radar represents the target image. Since this component of an image will not be produced during the unilluminated period, there will be no image manifestation component complementary thereto so that there will be no cancelling of the image manifestation component resulting from light transmitted by the radar and reflected by the target. Therefore, the image manifestation ultimately displayed will contain only the image manifestation component resulting from transmitted light, and not any components resulting from background or jamming.

Since no background information or noise appears in the image, due to the cancellation of complementary manifestations as described hereinbefore, the use of a display device having a high persistence will result in a build-up of the target image over a period of many cycles of transmission. Thus, the display device itself can improve the quality of the image over the strength of the image forming signals actually received.

As the high persistence of the display device builds the image, the target is moving. This causes a certain amount of "trail off" or fuzziness resulting from the motion of the target as repetitive images thereof are produced on the display device. If the range of the target from the radar is known, then the length of the trail off gives a fairly accurate direct indication of the transverse velocity of the target.

As is well known in the art, the time at which reflected energy is received at the radar device is an indication of the range of the target from the device. By adjusting the time at which the optical and display systems are responsive to received energy, the system in accordance herewith may be adjusted to make it responsive to targets at a given range, or within a band of ranges. Thus, the advantages of this system do not preclude the range-detecting capabilities which have heretofore been available.

Thus, the present invention includes an unscanned, broad field of transmission of radar energy combined with an optical system so as to provide a field responsive radar system (in contrast with scanned spot response used heretofore). Additionally, the dimensions of the field to be searched or viewed is controlled in the present invention by optics, rather than variations in rates and angles of scanning.

The present invention is capable of being implemented in a variety of ways, employing both hot cathode and solid state display devices, and is capable of utilizing the sophisticated techniques in the field of physical optics in order to achieve any required standards of sophistication, or resolution, as may be desired in a given implementation thereof.

An essential element of the present invention is means capable of responding to image manifestation so as to generate further manifestations in response thereto which are of opposite phase relationships. In a preferred embodiment of the invention, light received in an optical system is used to control display devices, the control being first adjusted so as to cause a negative of the received image to be formed and then to cause a positive manifestation of the image received to be formed. In a first device capable of achieving this, a well-known direct-view storage tube or display device of the scanned-beam type, is modified by removing the electrostatic data-sensitive scanning apparatus therefrom and using in place thereof the image converter and image intensifier stages of a light shutter or image deflection tube known in the prior art. In operation, the first stage (image converter) may be biased positively at the time that the radar is to be sensitive to images, so that during each transmission period and each period without transmission a gating grid will be positively biased so as to permit electrons emitted by photocathode to pass through the image converter. The photocathode is positioned adjacent to the optical system so that it is responsive to the image received by the optics of the radar. The electrons generated by the photocathode in the image converter impinge upon a secondary emission surface which causes additional electrons to flow, in the pattern of the image, through the image intensifier stage. The image intensifier stage may contain an electrostatic control for defining the velocity of the electrons as they leave the image intensifier stage. These electrons are directed toward a mosaic grid of the direct view storage tube. When the electrons impinge upon the mosaic grid at a nominal velocity, they will cause a concomitant negative charge at the point of contact with the grid. On the other hand, by increasing the potentials applied to the image intensifier, the electrons may be given a larger acceleration which causes them to impinge upon the mosaic grid at great velocity; in this case, the electrons cause secondary emission from the mosaic grid and tend to reduce the negative charge at the point of impact therewith. Thus, by adjusting the image intensifier stage of the modified direct view storage tube in accordance herewith, the mosaic grid may be either negatively or positively charged by the pattern of electrons flowing thereto in response to the image passed through the optical system and through the photocathode of the combination image converter-image intensifier. After both a positive and negative image charge is placed upon the mosaic grid of the direct view storage tube, the entire mosaic grid is flooded with electrons from a broad range cathode ray gun, which is referred to herein as a "flood gun." This will cause electrons to pass through the mosaic grid in the regions of positive charge and not in the regions of negative charge; the electrons which pass through the mosaic grid impinge upon the phosphorous surface of the display screen of the direct view storage tube and cause an image of light which corresponds with the image of back-scattered light received at the photocathode of the image converter-image intensifier through the optical system of the radar. Thus, the foregoing is a description of a hot cathode type of positive/negative display device suitable for use herein.

In an alternative embodiment of the present invention, a solid state positive/negative display device is utilized. This comprises an electrostatic image converter which is composed of an electroluminescent layer adjacent to a photoconductive layer, each of these layers contacting the other at a first surface; the opposite surface of each layer has a control grid adjacent thereto. An additional grid is embedded in the photoconductive layer. The electrostatic image converter is completed by having a transparent outer layer on each side (such as glass). The control grids may comprise transparent conductive coatings, there being one such coating on the input surface of the electroluminescent layer and another such coating on the output surface of a photoconductive layer. Adjusting the phase relationship of potentials applied to the two control grids relative to the embedded grid permits achieving either a positive or a negative image output in response to a negative image input. This device may be of the type described in an article by John R. Welk, "What's Happened to Electro Luminescence?", Journal of Industrial Research, March 1964.

The foregoing describes both hot cathode and solid state display devices suitable for use herein, but other devices may be suitably adapted for the purposes described.

Apparatus for the operation of the present invention requires that the high energy source (such as a light-generating laser) be pulsed in a known-time relationship relative to the control potentials applied to the display device so that the display device will be responsive in a positive-image forming manner at some known interval of time (depending upon range) following the transmission of the light or other energy, and responsive in a negative image forming manner during the similar portion of a preceding period in which there is no light transmission. A time at which a display device is responsive to the optical system may be adjusted to be sooner or later for shorter and longer target ranges, and this time may be made greater or lesser so as to extend or compress the band of ranges to which the radar will respond, respectively. In the case of the hot cathode display device, a display gate is utilized at the end of the light-transmitting period (but not at the end of the nontransmitting period) so that the mosaic grid of the display tube will be both charged and discharged prior to flooding the grid with electrons from the flood gun. This causes only the difference between the background and the image received as a result of backscattering of transmitted light to appear on the viewing screen of the direct-view storage tube as modified herein. In the case of the electrostatic image converter, both positive and negative images will be generated at the viewing surface of the device; however, these images will be displayed so rapidly (hundreds of cycles per second) that they will cancel each other and not be visible to the human eye. The only portion which is uncancelled is that of the illuminated target, and this image will be presented in every other period so that it will appear to the human eye as a steady state manifestation of the target.

The foregoing illustrates the relative simplicity of a radar system in accordance herewith, and the capability of implementing the invention herein in a variety of embodiments utilizing a wide range of parameters in the design of the components therefor.

Other objects, features and advantages of the present invention will become more apparent in the light of the following detailed description of preferred embodiments thereof, as illustrated in the accompanying drawings.

In the drawings:

FIG. 2 is a simplified block diagram of a radar system in accordance with the present invention;

FIG. 3 is a schematic block diagram of a control system, including power supplies, for use in the present invention;

FIG. 4 is a diagrammatic illustration of a display tube suitable for use in the embodiment of the present invention illustrated in FIGS. 2 and 3;

FIG. 5 is a simplified partially broken away sectioned elevational view of an electrostatic image converter suitable for use as an alternative to the display tube of FIG. 4 within the embodiment illustrated in FIGS. 2 and 3; and FIG. 6 is a timing diagram illustrating typical signal waveform relationship in the embodiments of FIGS. 2 and 3.

Figure 1A:
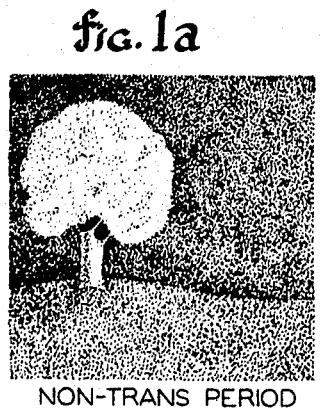
FIGURES 1a–1d are a series of illustrations depicting the basic principles of the present invention.
Figure 1B:
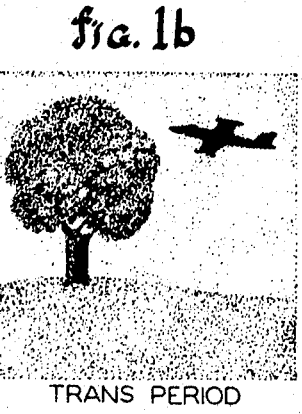
Figure 1C:
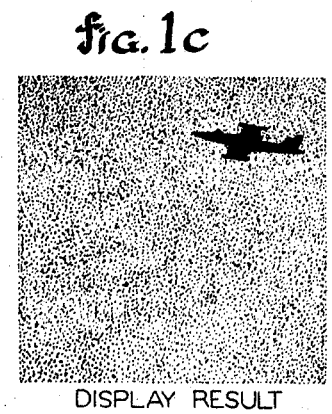

The principle of the invention is illustrated in the various views of FIGURES 1a–1d. In FIG. 1a is shown the conditioning of the display device during a nontransmitting period, which includes the background image resulting from energy sources other than those transmitted by radar. This image is utilized so as to condition the display device to produce the image in a negative fashion (similar to the negative of a photograph). FIG. 1b illustrates that during the transmission period, the display device is conditioned so as to give a positive indication of the image including a target, such as an airplane. Because the images of FIGS. 1a and FIG. 1b are complementary with exception of the target which has been introduced to the image from the backscattering of energy transmitted by the radar, the two pictures will cancel with the exception of the target as illustrated in FIG. 1c. The manner of causing this cancellation may be achieved in a variety of manners described generally hereinbefore and more particularly with reference to FIGS. 4 and 5 hereinafter.

Figure 1D:
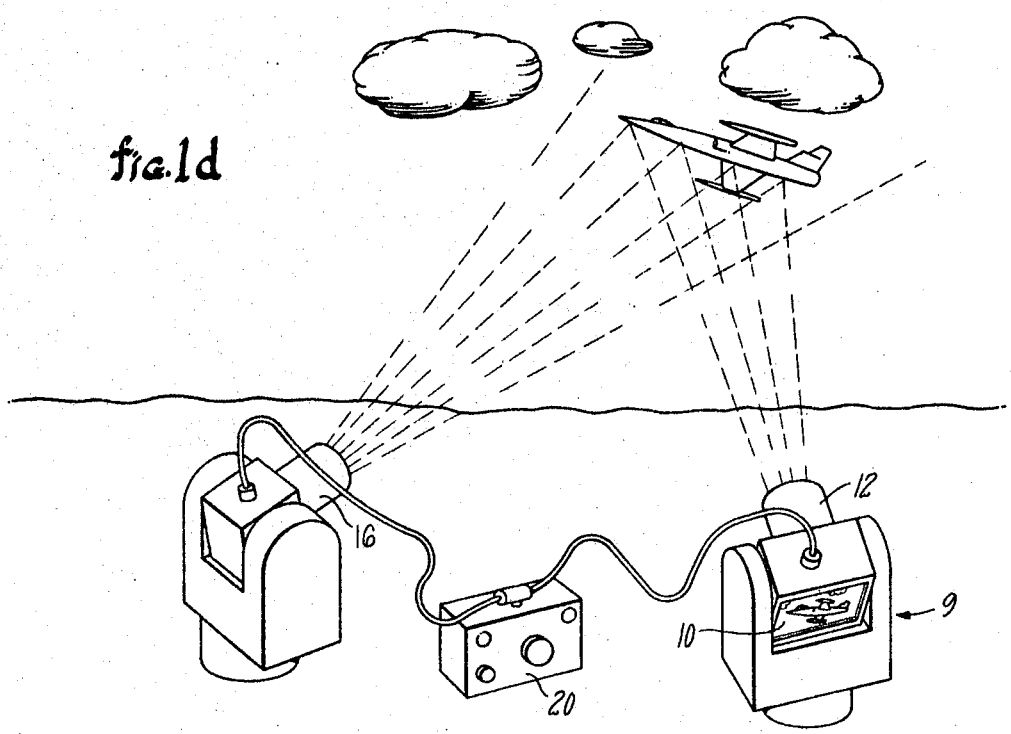

Referring now to FIG. 1d the basic operating mode of the present invention is illustrated. Therein, a phase sensitive image detection receiver includes a display device 10 and an optical system 12. An area to be viewed by the radar is periodically illuminated by high-powered energy from a transmitter 16, which may comprise a pulsed laser. Both the transmitter 16 and the phase sensitive image detection receiver 9 are controlled in an integral fashion by a control device 20. By flooding the entire area to be viewed with energy, and receiving backscattered light or other energy from the entire target area at one time, broad angle field searching and tracking is possible. The optical system receives the entire field of image at one time and through electron optics converts this into an image on the display device 10.

The system for producing the effects illustrated in FIGURES 1a–1d is shown in simplified block fashion in FIG. 2. Therein, a display device 10, which may be of several suitable forms described hereinbefore, is responsive to energy, such as light, and other energy in the near-visual spectrums, which is received by an optical system 12. As illustrated in FIG. 2, the optical system 12 may also be utilized, by means of a partially reflecting mirror 14 or other suitable apparatus, to shape the energy to be transmitted from a transmitter 16. This is an alternative to separate transmitter and receiver shown in FIG. 1d. As an example, the transmitter may comprise a pulsed laser which may be selected to operate at a frequency suitable to the particular utilization of apparatus in accordance herewith. If the critical laser element comprises ruby, the wave length of the transmitted energy will be approximately .69 micron; neodymium will provide energy having a wave length of 1.06 microns; and carbon dioxide gives a somewhat lower frequency energy having a wave length of about 10.6 microns. The first two of these fall within the near-visual spectrum, and the optical system may be chosen to suit the wave length of the laser chosen. Of course, other suitable sources of high-powered energy may be utilized within the range of wave lengths suitable for use with physical optics.

The optical system 12 may be of any suitable form, but preferentially would include what is commonly referred to as a "zoom lens" to give the operator control over the magnification of the target on the image produced by the display device. With such an optical system, it is possible for wide angle searching for targets, with the ability to "zoom in" on the target for detailed analysis of the configuration thereof once a target is located. All of this is in accordance with well-known optical techniques utilized in the optical and photographic arts.

The display device 10 utilizes controlling potentials from a suitable power supply 18, which also provides proper power to a control circuit 20. The control circuit 20 controls the timing and phase relationship of the alternative periods of operation, controls the time at which the receiving apparatus (the optical system and display device) are responsive to reflected energy so as to govern the effective range setting of the system, and controls the duration of time at which the system will be responsive to reflected energy whereby the band of ranges to which the system is responsive may be adjusted broadly for wide angle searching and more specifically for unique target identification. Thus, both range and depth of range may be electronically controlled by the potentials supplied by the control device 20. Signals produced by the control device 20 are illustrated in FIG. 6. Therein, the basic controlling signal may be that of a square wave oscillator as shown in illustration a of FIG. 6. From this there may be derived alternative period-defining signals which are referred to as "clock" and "not-clock" (C NOT C) and are shown in illustrations b and c of FIG. 6. The alternative relationship of the "clock" and "not-clock" signals is defined herein as "interleaved." For illustrative purposes, the clock signal is taken to be the period of non-transmission and the not-clock signal is taken to be the period of transmission, and therefore the transmitter is gated at or about the start of the not-clock signal. This is shown in illustration d of FIG. 6. During both clock and not-clock signals, the display device is made responsive to an image control gating signal as shown in illustration e of FIG. 6. However, the display device of the hot cathode type is not caused to render a display except at the end of not-clock time so that the cancellation effects described hereinbefore are achieved prior to causing the device to generate a display. When an electrostatic display is used, the positive and negative images appear alternatively at sufficient speed that only the illuminated target is capable of discernment by the human eye. Both devices are controlled so as to give a display only at a time (IMAGE CTRL GATE) which relates to the desired received signal (illustration f, FIG. 6).

A typical control system, suitable for use in the radar system of FIG. 2 to provide signals as described with respect to FIG. 6, is illustrated in FIG. 3. As illustrated therein, the basic timing control signal may emanate either from an oscillator 22 or from a random signature generator 24 which may generate a signal having a wave shape of a purely random nature, or of a substantially definable nature, but varying in frequency, or phase. In normal operation, an AND circuit 26 will gate the output of the oscillator 22 to the clock circuit 28, but when maximum anti-jamming capability is desired, then an AND circuit 30 may, instead, provide the gating by moving switch 31 to the ANTI-JAM position. The clock circuitry 28 is made jointly responsive to either of the gates 26, 30 in some suitable manner such as by means of a well-known OR circuit 32 which is capable of responding at the frequencies of the oscillator 22 or the random signature generator 24. It should be understood that this is illustrative merely, and suitable combinations of signal generators and clocking circuitry may be provided in accordance with any well-known technique. The clock circuitry may be of many well-known varieties, and for instance, may include variable single shots (monostable multivibrator circuits 34, 36) which will vary the length of time (W, FIG. 6) during which the optical and visual display systems will be responsive to image forming energy so as to adjust the band of ranges to which the radar will respond.

The not-clock signal (NC) derived from the single shot 34 is used as a transmitter gate (XMTR GATE), which may be applied to the source of transmitted energy (XMTR16, FIG. 2) as a triggering signal to thereby define the pulse rate of the transmitted energy. For instance, this may be used to pulse a laser. Both the clock and not-clock signals are also applied to an OR circuit 38 so that each of these signals will energize a variable delay circuit 40, the output of which is utilized as an image control gate. The image control gate is used in a direct view storage tube to cause the image converter portion thereof to pass electrons generated at the photocathode to the image intensifier portion thereof. It is this action which causes the optical system to be responsive to light received from the field of view. In the case of the electrostatic display device, the image control gate signal may be utilized to gate the controlled-phase signals which are applied to the controls grids, as is described hereinafter. In order to get the images of background and noise to cancel, it is necessary that the period of the single shots 34, 36 be adjusted to be nearly identical.

The not-clock signal from the single shot 34 is also applied to a delay unit 42 so as to provide a flood gun gate signal to be used to cause the flood gun in the hot cathode display device modified (direct view storage tube) to flood the mosaic grid with electrons thereby to generate an image on the phosphorous surface of the viewing area of the tube. This signal would not be used in an embodiment incorporating the electrostatic display device.

Each of the clock and not-clock signals are applied to respective AND circuits 44, 46 so as to gate appropriate positive and negative image forming control potentials to the hot cathode display device, an OR circuit 48 causing a DISPLAY GATE signal to be generated in response to either of the gating AND circuits 44, 46. The positive and negative image forming control potentials must, of course, be gated by circuitry capable of handling suitably high voltage so as to provide proper potentials to form either a positive or negative electron charge image in the hot cathode, modified direct view storage tube type of display device illustrated in FIG. 4 and described hereinafter. Of course, simple low level logical circuits cannot be used for the AND and the OR circuits 44–48, these being exemplary merely of the control therefor, and suitable well known high voltage circuitry may be utilized. For instance, the AND circuit 46 may comprise a high voltage relay, or the AND circuit 46 may include all of the elements except the actual high voltage output of the DC voltage supply, and the output of the AND circuit 46 may be applied to operate a high voltage relay to apply voltage to the tube. Similarly, well-known expedients may be utilized to provide controls as illustrated in FIG. 3 at a suitably high voltage level.

The DC voltage supply 80 (bottom of FIG. 3) may be of any suitable type so as to provide voltage high enough so as to cause secondary emission, on the high volts line, and to provide a voltage suitable for forming negative charges, on the low volts line. As is described hereinafter, utilization of the high voltage of the DC voltage supply 80 will cause the production of a positive image by providing a positive charge through which electrons can pass, whereas use of the low voltage output of the DC voltage supply 80 will cause a negative image to be generated by negative charges which block the flow of electrons to the viewing screen. Thus, during the period of transmission (as defined by the NOT CLOCK signal) high voltage will be gated to the circuits 44, 48; but during the nontransmitting period, the low voltage will be passed through the circuits 44, 48 so as to cause a negative image.

Similar circuitry is provided at the bottom of FIG. 3 to generate controlled-phase potentials for operating the electrostatic display device in accordance with a second embodiment of the present invention. The utilization of these potentials is described in detail hereinafter with respect to FIG. 5, the basic consideration for which is the provision of two different phases of AC voltage which may be adjusted or reversed so as to provide first a negative image followed by a positive image in successive operations of the device. The circuits at the bottom of FIG. 3 receive two different AC voltages ($\phi1$, $\phi2$) which may be applied in complementary fashion to a PHOTO GATE line and to a LUM GATE line, which are used to energize a photoconductive layer control grid and a luminescent layer control grid, respectively. The phase 1 ($\phi$-) signal is applied to each of two AND circuits 82, 84, which are respectively operated during not clock time and during clock time. Whenever the AND circuit 82 operates, an AND circuit 88 will simultaneously be operated so as to pass a phase 1 signal from the AC voltage supply 81; similarly when AND circuit 84 is operated during clock time, the related AND circuit 88 will also be operated. All of the AND circuits 82, 88 are gated with the image control gate singal from the variable delay unit 40, so as to permit operation of the electrostatic display device only at a time which is proper with respect to the desired received signal resulting from backscattering of transmitted energy, or a corresponding time of the interleaved, nontransmitting period. The AND circuits 82, 88 are also responsive only when use of an electrostatic display device is indicated by closing the circuit connection 90. A similar connection 92 is applied to the AND circuits 44, 46 for causing generation of high and low voltage display gate signals when a hot cathode display device is used. Either of the AND circuits 82, 88 may operate an OR circuit 94 so as to generate a signal on the PHOTO GATE line, and similarly AND circuits 84, 86 operate an OR circuit 96 so as to generate a signal on the LUM GATE line. These signals are utilized to control the positive and negative image generation within the electrostatic display device as described with respect to FIG. 5 hereinafter.

In FIG. 4 is illustrated a hot cathode display device which comprises a modified direct view storage tube as referred to hereinbefore. Therein, an image screen 46 includes a phosphorous surface 48 which develops a light image in response to the bombardment thereof by electrons. The electrons are selectively passed to the phosphorous surface by a mosaic grid structure 50 which permits the passage therethrough of electrons in positively charged areas, but blocks electrons in areas which are negatively charged. The charge on the mosaic grid 50 is determined by electrons which are transmitted thereto by the combination image-converter/image-intensifier portion of the tube 52, 54. The velocity at which electrons bombard the mosaic 50 is determined by the potential of the display gate signal applied to a grid of the image intensifier 54. If this is a very highly positive potential, then the electrons will be accelerated to a high velocity so as to cause secondary emission at the mosaic grid 50 thereby reducing the negative charge at a point which is hit by an electron. On the other hand, if the display gate voltage is somewhat lower, then the velocity of the electrons which hit the mosaic grid 50 is low enough to permit the electrons to collect on the grid 50 thereby causing a negative charge for each electron which hits the mosaic grid 50. The image intensifier receives a pattern of electrons from a secondary emission surface 56 which is caused to emit electrons in response to electrons impinging thereon from the image converter 52. The image converter 52 is gated (so as to pass electrons) by the presence of the image control gate signal, and will not pass any electrons in the absence of the image control gate signal. The electrons in the image converter 52 result from a photocathode 58 which in turn is rendered responsive to light transmitted thereto through the optical system 12. In this fashion, any image received by the optical system 12 will cause a corresponding electron image to be generated at the photocathode 58, this electron image being shaped and transmitted to the secondary emission surface 56 of the image intensifier 54 when the image control gate is present. This in turn will cause a highly amplified pattern of electrons to pass through the image intensifier at a velocity determined by the potential of the display gate signal. During the periods of nontransmission, the display gate signal is caused to be only moderately positive (by the controls of FIG. 3) so as to cause negative charging of the mosaic grid 50 in response to the pattern of electrons. However, during a period of transmission of light to the target area, the display gate signal is rendered highly positive so as to accelerate the electrons sufficiently to cause secondary emission at the mosaic grid 50. Thereafter, the flood gun gate is applied to a flood gun 60 so as to cause the mosaic grid to be sprayed with electrons, which pass therethrough selectively in dependence upon the potentials established on the mosaic grid 50 by the images transferred through the image converter 52 and the image intensifier 54.

An alternative display device comprises the electrostatic image converter illustrated in FIG. 5. The image converter of FIG. 5 receives a light image from the optical system 12 at the left-hand end thereof as illustrated in FIG. 5. It enters a clear glass protective layer 62 and then passes through a transparent conductive coating 64. Light which passes through the transparent conductive coating 64 reaches a photoconductive layer 66 which generates electric stresses which are applied to the adjacent electroluminescent layer 68. The electroluminescent layer 68 generates an image of light which passes through a second transparent conductive coating 70 which is then viewable at the right-hand end of FIG. 5 through a transparent shield, such as a glass layer 72. Within the photoconductive layer 66 is embedded a grid structure 70 which acts in a manner similar to the grid of a triode and provides the quality of positive/negative image formulation in the electrostatic image converter. This grid 74 is grounded, and the control grids have variable phase signals applied thereto, which, in the case of the electrostatic display device being described, will comprise alternating current voltages of either a first or second phase relationship depending upon which of the two periods (transmission or nontransmission) is involved. The display gate is generated only during the presence of the image control gate, as is illustrated in and described with respect to FIG. 3 hereinbefore. The phase relationship of the LUM GATE and PHOTO GATE is adjusted to either of two complementary conditions relative to a basic phase applied to the grid 74 so as to achieve the properties of positive and negative image production described hereinbefore. The presence on the PHOTO GATE signal of a signal of a first phase, with the second phase on the LUM GATE line, will cause a positive image to be generated by the electroluminescent layer 68, and the reverse phase relationship will cause a negative image to be generated by the electroluminescent layer 70. This operation is as described in the aforementioned Industrial Research article.

Although the invention has been shown and described with respect to preferred embodiments thereof, it should be understood by those skilled in the art that various changes and omissions in the form and detail thereof may be made therein without departing from the spirit and scope of the invention, which is to be limited only as set forth in the following claims.

Having thus described our invention, what we claim as new and desire to secure by Letters Patent of the United States is:

1. A radar system comprising:
    control means for periodically producing a sequence of first control signals and a sequence of second control signals interleaved in time with said first control signals and for generating a transmission control signal immediately preceding each of said first control signals;
    transmitting means for transmitting high intensity energy into an area to be viewed by the radar system in response to said transmission control signals;
    a receiver system disposed and adjusted with respect to said high intensity energy source so as to receive energy thereat as a result of backscattering of the energy of said energy source from targets within an area to be viewed by the radar system and to receive ambient energy from said area; and
    display means responsive to said receiver system and susceptible to said first control signals to generate a positive image corresponding to the image received by said receiver system at times corresponding with said first control signals, and responsive to said second control signals to generate a negative image correponding to the image received by said receiver system at times corresponding with said second control signals, said display means thereby presenting positive and negative images in respective alternative time periods, only every other one of which includes image information resulting from backscattering of energy from said transmitting means.

2. The radar system according to claim 1 wherein said receiver comprises a system of physical optics for receiving an image, optical-electrical means responsive to said system of physical optics for generating electrical signals corresponding to the image presented by said system of physical optics, and electro-optical means for generating, in response to the electrical signals developed by said optical-electrical means, positive manifestations of an image in response to said first control signals and negative visible manifestations of an image in response to said second control signals.

3. The radar system according to claim 1 wherein said means includes means for varying the duration of said first and second control signals, whereby band of ranges to which the radar system is responsive may be adjusted.

4. The radar system according to claim 1 wherein said control means further comprises means for spacing said first and second control signals in time a determinable amount from said transmission control signal, whereby the range to which the radar system is responsive may be determinably controlled.

5. The radar system according to claim 4 wherein the spacing means further comprises means for adjusting the spacing in time between said first and second control signals, whereby the nominal range of the band of ranges to which said radar is responsive may be adjusted.

References Cited

UNITED STATES PATENTS

| | | | |
|---|---|---|---|
| 2,668,286 | 2/1954 | White | 343—7.7 |
| 3,051,947 | 8/1962 | Engel | 343—7.7 |
| 3,053,134 | 9/1962 | Bjornson | 88—1 |
| 3,305,633 | 2/1967 | Chernoch | 88—1 |

RODNEY D. BENNETT, Jr., Primary Examiner

CHARLES E. WANDS, Assistant Examiner

U.S. Cl. X.R.

343—7.7